United States Patent
Nagano

(10) Patent No.: US 12,522,299 B2
(45) Date of Patent: Jan. 13, 2026

(54) VEHICLE BOTTOM STRUCTURE

(71) Applicant: TOYOTA JIDOSHA KABUSHIKI KAISHA, Toyota (JP)

(72) Inventor: Shinji Nagano, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 436 days.

(21) Appl. No.: 18/127,708

(22) Filed: Mar. 29, 2023

(65) Prior Publication Data

US 2023/0312015 A1 Oct. 5, 2023

(30) Foreign Application Priority Data

Apr. 1, 2022 (JP) .................................. 2022-061936

(51) Int. Cl.
*B62D 25/20* (2006.01)

(52) U.S. Cl.
CPC .................................... *B62D 25/20* (2013.01)

(58) Field of Classification Search
CPC .......................... B62D 25/20; B62D 25/2027; B62D 25/2036; B62D 21/157; B62D 16/2015; B62D 16/08; B62D 21/03; B60R 16/2015; B60R 16/08
USPC ................................ 296/193.07, 187.08, 204
See application file for complete search history.

(56) References Cited

U.S. PATENT DOCUMENTS

| | | | |
|---|---|---|---|
| 5,806,918 A * | 9/1998 | Kanazawa | B62D 25/2018 296/30 |
| 6,085,854 A * | 7/2000 | Nishikawa | H01M 10/613 180/68.5 |
| 6,932,405 B2 * | 8/2005 | Nakagawa | B62D 29/008 296/205 |
| 7,204,547 B2 * | 4/2007 | Okana | B62D 25/2018 296/204 |
| 7,644,978 B2 * | 1/2010 | Tosaka | B60N 2/005 296/193.07 |
| 8,292,356 B2 * | 10/2012 | Ishigame | B60N 2/005 296/193.07 |
| 8,714,634 B2 * | 5/2014 | Mori | B62D 25/20 296/193.07 |
| 9,272,637 B2 * | 3/2016 | Han | B60N 2/005 |
| 9,281,505 B2 * | 3/2016 | Hihara | B62D 25/20 |
| 9,440,523 B2 * | 9/2016 | Decker | B60K 1/04 |
| 9,688,314 B2 * | 6/2017 | Ajisaka | B60K 15/073 |
| 10,723,393 B2 * | 7/2020 | Izuhara | B62D 27/02 |
| 10,889,336 B2 * | 1/2021 | Friedman | B62D 25/025 |
| 2008/0315629 A1 * | 12/2008 | Abe | B62D 35/02 296/193.07 |
| 2010/0187864 A1 * | 7/2010 | Tsuchida | B62D 25/20 296/193.07 |

(Continued)

FOREIGN PATENT DOCUMENTS

| | | |
|---|---|---|
| JP | 2007-083908 A | 4/2007 |
| JP | 2009-001038 A | 1/2009 |
| JP | 2021-112969 A | 8/2021 |

*Primary Examiner* — Amy R Weisberg
*Assistant Examiner* — Veronica M Condo
(74) *Attorney, Agent, or Firm* — Dinsmore & Shohl LLP

(57) ABSTRACT

A vehicle bottom structure includes a cross member disposed on a bottom of a vehicle and elongated along a vehicle width, a plurality of column members disposed at intervals along the vehicle width, each protruding downward from a bottom face of the cross member, and a brace extending to connect the plurality of column members.

10 Claims, 9 Drawing Sheets

A-A CROSS SECTION

(56) References Cited

U.S. PATENT DOCUMENTS

| | | | |
|---|---|---|---|
| 2012/0212009 A1* | 8/2012 | Ishizono | B62D 25/2036 296/193.07 |
| 2013/0038090 A1* | 2/2013 | Hwang | B60R 13/0876 296/193.07 |
| 2016/0039467 A1* | 2/2016 | Takenaka | B62D 21/15 296/193.07 |
| 2016/0207572 A1* | 7/2016 | Natsume | B62D 25/20 |
| 2020/0031399 A1* | 1/2020 | Matsuda | B62D 25/2036 |
| 2021/0221239 A1 | 7/2021 | Kawase | |

* cited by examiner

B-B CROSS SECTION

C-C CROSS SECTION

VEHICLE BOTTOM STRUCTURE

CROSS REFERENCE TO RELATED APPLICATION

This application claims priority to Japanese Patent Application No. 2022-061936 filed on Apr. 1, 2022, which is incorporated herein by reference in its entirety including the specification, claims, drawings, and abstract.

TECHNICAL FIELD

The present disclosure relates to a vehicle bottom structure including a cross member that is a frame member elongated along the width of a vehicle.

BACKGROUND

Typically, a vehicle includes, at its bottom, a pair of side members elongated along the vehicle length and a plurality of cross members connecting the pair of side members. Patent Document 1 discloses a vehicle bottom structure including such side members (referred to as "rockers" in Patent Document 1) and cross members as described above.

CITATION LIST

PATENT LITERATURE: JP 2021-112969 A

SUMMARY

The cross member, which is a frame member that supports the vehicle body, requires high flexural rigidity. The flexural rigidity depends on the second moment of inertia which is proportional to a power of the dimension of the cross member along the vehicle length of the cross member, or the width of the cross member, and to the third power of the dimension of the cross member along the vehicle height, or the height of the cross member. The second moment of inertia therefore depends more on the height of the cross member than on its width. To secure sufficient flexural rigidity of the cross member, it is therefore necessary to ensure of the cross member has a sufficient height.

However, increasing the height or vertical dimension of the cross member would accordingly reduce space within a vehicle cabin or reduce a space at the bottom of the vehicle where conduit and wiring are installed.

The present specification therefore discloses a vehicle bottom structure that allows further enhancement of the flexural rigidity of a cross member while avoiding increasing the vertical dimension or height of the cross member.

In accordance with an aspect of the disclosure, a vehicle bottom structure includes a cross member disposed on a bottom of a vehicle and elongated along a vehicle width, a plurality of column members disposed at intervals along the vehicle width, each protruding downward from a bottom face of the cross member, and a brace extending to connect the plurality of column members.

When a downward force applied to the cross member flexes the cross member downward, a plurality of column members protruding from a bottom face of the cross member change their orientations to thereby change the interval between a pair of adjacent column members. The brace extending to connect the plurality of column member as described above effectively prevents a change in the interval between the adjacent column members. This also effectively reduces bending of the cross member and enhances the flexural rigidity of the cross member.

In this configuration, a linear member that is wiring or conduit may pass through a passage channel that is a space enclosed by the cross member, a pair of adjacent column members of the plurality of column members, and the brace.

This configuration eliminates the need for a separate space for the linear member to pass through, enabling more efficient use of the space at the bottom of the vehicle.

The vehicle bottom structure may further include a tunnel rising upward from a floor panel and elongated along the vehicle length. The plurality of column members may include a pair of column members adjacent along the vehicle width, and the pair of column members may be respectively disposed at positions in the vehicle width direction substantially corresponding to widthwise positions of respective opposite ends of the tunnel along the vehicle width.

This configuration allows an inner space of the tunnel to substantially align with the passage channel. This further enables the route of the linear member passing through both the internal space of the tunnel and the passage channel to be substantially straight to thereby effectively prevent curving and bending of the linear member.

The cross member may include a center portion and a pair of base portions located on opposite sides of the center portion along the vehicle width. The center portion may include a bottom face located further upward than bottom faces of the respective base portions, to thereby secure a vertical dimension or height that is smaller than the vertical dimensions or heights of the base portions. The plurality of column members may protrude downward from the bottom face of the center portion.

The above configuration including the column members disposed in the center portion can reduce the overall vertical dimension of the complete beam member including the cross member, the column members, and the brace.

With this configuration, the cross member may further include transition portions between the center portion and the respective base portions, and each of the transition portions may include a bottom face that is gradually inclined upward as the bottom face extends from the base portion toward the center portion.

Providing a transition portion having a gradually varying height disposed between the center portion and the base portion reduces the stress concentration at a connection point between the center portion and the base portion. This further effectively prevents bending or breaking of the cross member.

Each of the plurality of column members may have a substantially box shape that, in conjunction with the bottom face of the cross member, defines a closed space.

This configuration increases the rigidity of the column member to thereby effectively prevent deformation of the column member while also preventing bending of the cross member.

The cross member may include a cross member upper and a cross member lower that face each other. The cross member upper may include, in the center portion of the cross member, an extension portion extending further downward past a front lower end of the cross member lower. Each of the plurality of column members may include a bottom wall facing the cross member, a rear wall extending upward from a rear end of the bottom wall, and a pair of side walls extending upward from respective opposite ends of the bottom wall along the vehicle width and joined to the bottom face of the cross member. The bottom wall and the pair of side walls of the column member may have front ends joined to the extension portion, and the extension portion may include a portion that faces the rear wall of the column member and functions as a front wall of the column member.

This configuration further enhances rigidity of the column member and more effectively reduces deformation of the column members and bending of the cross members more effectively.

The brace may be disposed within the vertical dimension of the cross member.

Employing this configuration can reduce the overall vertical dimension or height of the complete beam member including the cross member, the column members, and the brace, to that of the vertical dimension or height of a beam member including no column members and no brace, thereby avoiding increasing the size of the beam member.

The vehicle bottom structure may further include a pair of side members that are frame members coupled with respective opposite ends of the cross member along the vehicle width and elongated along the vehicle length, and the brace is disposed within the vertical dimension of the pair of side members.

This configuration can reduce the overall vertical dimension or height of the complete vehicle bottom structure including the cross member, the column members, the brace, and the side members to that of the vertical dimension or height of a vehicle bottom structure including no column members and no brace, thereby avoiding increasing the size of the vehicle bottom structure.

The vehicle bottom structure disclosed in the present specification can enhance the flexural rigidity of the cross member while preventing an increase in the vertical dimension of the cross member.

BRIEF DESCRIPTION OF DRAWINGS

Embodiments of the present disclosure will be described based on the following figures, wherein.

DESCRIPTION OF EMBODIMENTS

Figure 1:
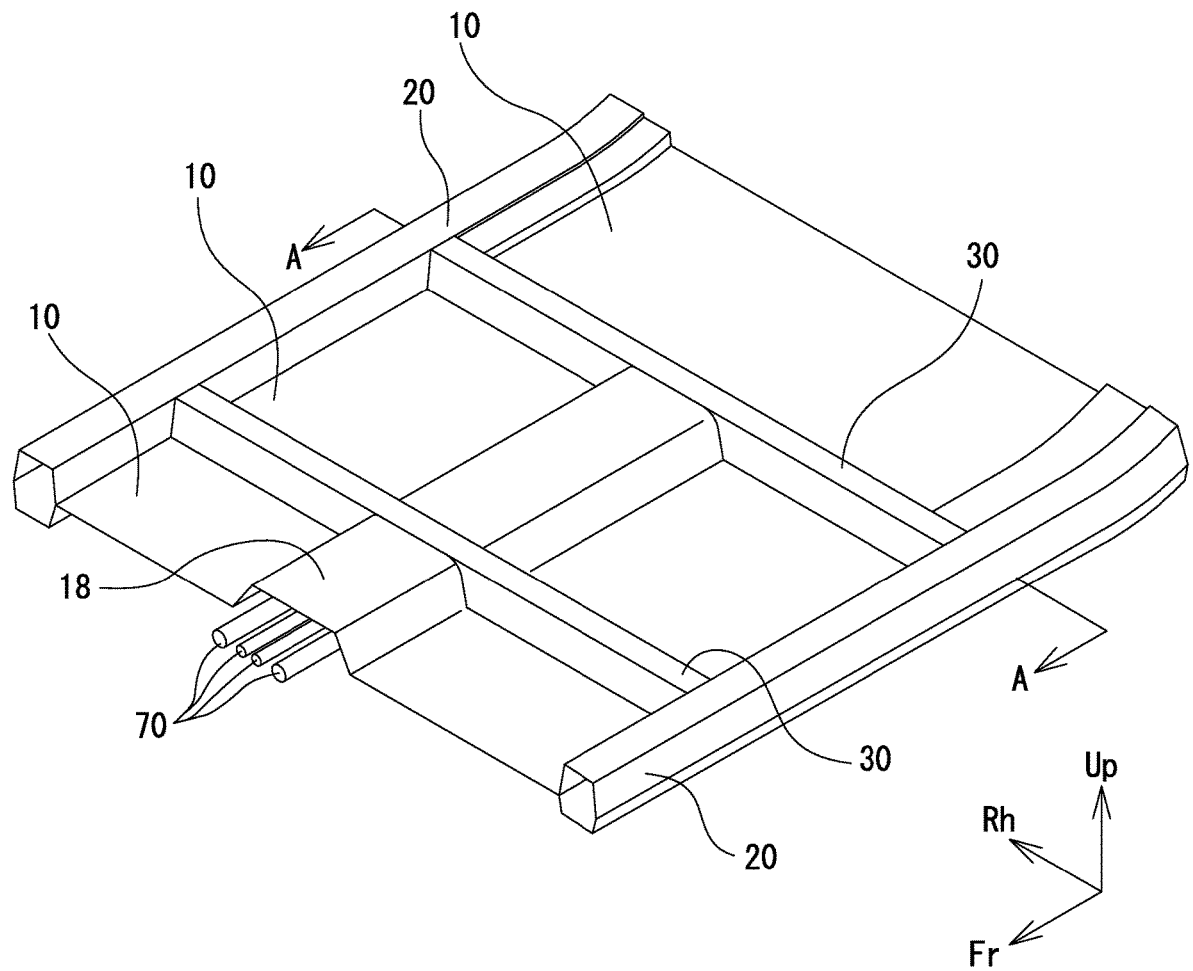
FIG. 1 is a perspective view schematically illustrating a bottom portion of a vehicle.

A vehicle bottom structure will be described below by reference to the drawings. FIG. 1 is a perspective view schematically illustrating a bottom portion of a vehicle. In each of the drawings, the labels "Fr", "Up", and "Rh" respectively indicate frontward, upward, and rightward directions of a vehicle.

As illustrated in FIG. 1, a vehicle includes, at its bottom portion, a floor panel 10 that functions as a floor of a vehicle cabin. The floor panel 10 is a panel member extending horizontally and is composed of a plurality of panel member parts.

Figure 2:
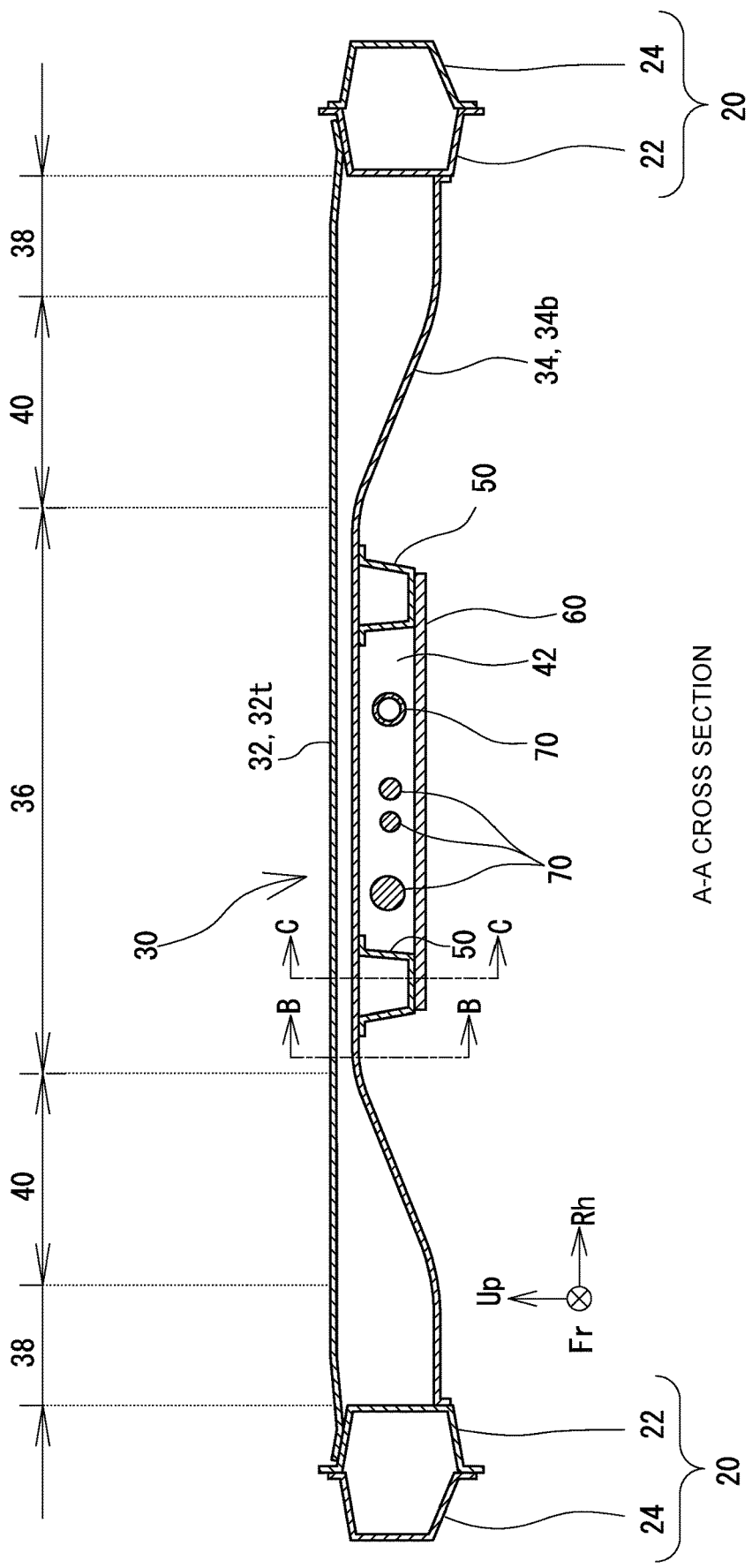
FIG. 2 is a vertical cross sectional view of a cross member, taken along line A-A in FIG. 1.

The floor panel 10 has opposite side ends along the vehicle width, to which side members 20 are respectively coupled. The side member 20 is a frame member elongated along the length of the vehicle. As illustrated in FIG. 2, the side member 20 includes a side member inner 22 and a side member outer 24 joined to each other.

The floor panel 10 includes a tunnel 18 elongated along the vehicle length, at the center of the floor panel 10 in the vehicle width direction. Specifically, the center part of the floor panel 10 is raised upward of the vehicle to form the tunnel 18. A plurality of linear members 70, wires or conduits, pass through an inner space of the tunnel 18.

A plurality of (two, in the illustrated example) cross members 30 are further disposed at the bottom of the vehicle. The cross member 30 is a frame member elongated along the vehicle width, and the side members 20 are joined to respective side ends of the cross member 30 along the vehicle width.

Figure 3:
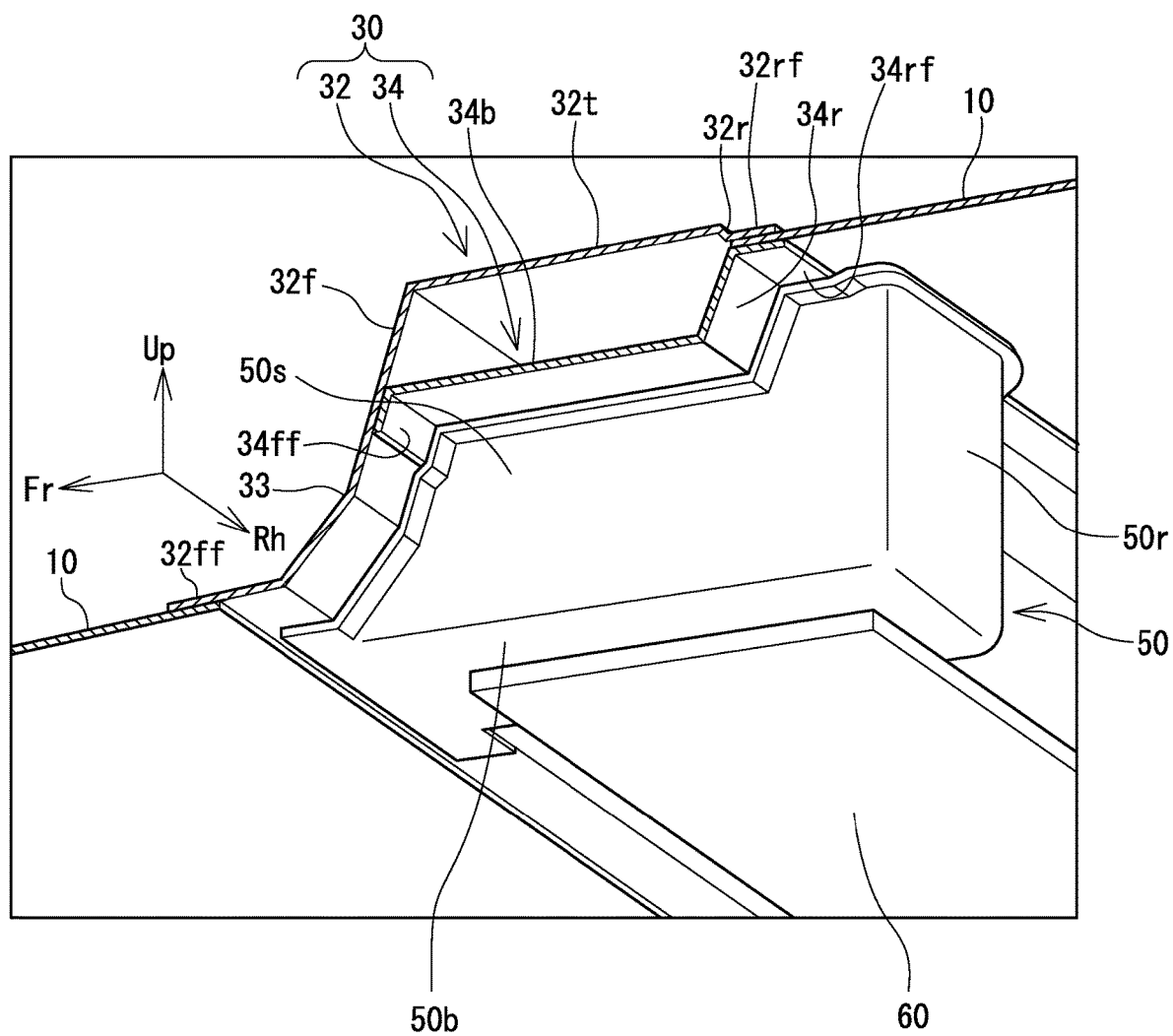
FIG. 3 is a perspective cross sectional view taken along line B-B in FIG. 2.

The configuration of the cross member 30 will be described in detail with reference to FIGS. 2, 3, and 4. FIG. 2 is a vertical cross sectional view of the cross member 30, taken along line A-A in FIG. 1. FIG. 3 is a perspective cross sectional view taken along line B-B in FIG. 2, and FIG. 4 is a cross sectional view taken along line C-C in FIG. 2.

Figure 4:
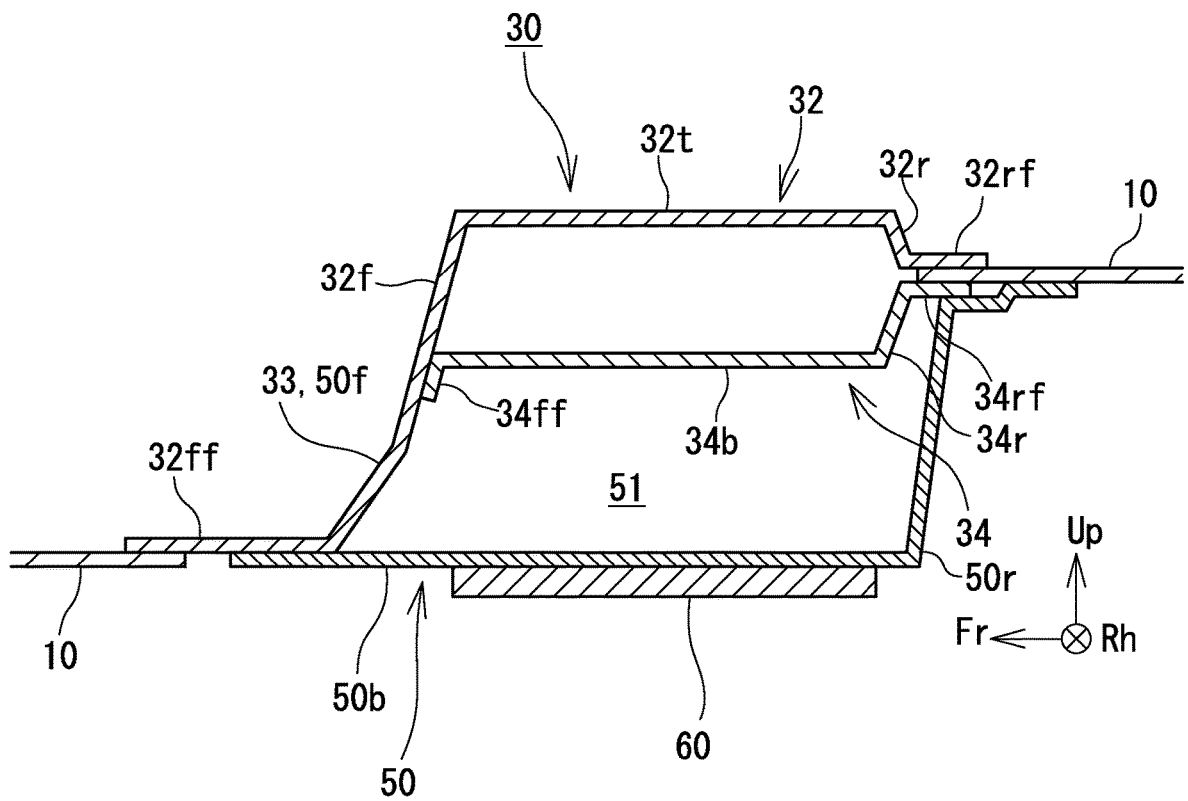
FIG. 4 is a cross sectional view taken along line C-C in FIG. 2.

As illustrated in FIG. 3 and FIG. 4, the cross member 30 includes a cross member upper 32 and a cross member lower 34 joined to each other. The cross member upper 32 is a channel shape member that opens downward of the vehicle and is elongated along the vehicle width. More specifically, the cross member upper 32 includes a top wall 32*t* substantially parallel to the horizontal direction, a front wall 32*f* extending downward from a front edge of the top wall 32*t*, a front brim 32*ff* extending forward from a lower edge of the front wall 32*f*, a rear wall 32*r* extending downward from a rear edge of the top wall 32*t*, and a rear brim 32*rf* extending rearward from a lower edge of the rear wall 32*r*. The cross member lower 34 includes a bottom wall 34*b* facing the top wall 32*t* vertically, a front brim 34*ff* extending downward from a front edge of the bottom wall 34*b*, a rear wall 34*r* extending upward from a rear edge of the bottom wall 34*b*, and a rear brim 34*rf* extending rearward of the vehicle from an upper edge of the rear wall 34*r*. The front wall 32*f* of the cross member upper 32 and the front brim 34*ff* of the cross member lower 34 are joined to each other, and the rear brim 32*rf* of the cross member upper 32 and the rear brim 34*rf* of the cross member lower 34 are joined to each other via the floor panel 10.

As illustrated in FIG. 2, the bottom face or bottom wall 34*b* of the cross member approaches a top surface or top wall 32*t* of the cross member 30 at the center along the vehicle width, and the vertical dimension or height of the cross member 30 at the center along the vehicle width is therefore smaller than the heights in the remaining regions of the cross member 30. In other words, in this example, the cross member 30 includes a center portion 36 having a smaller height, a base portion 38 having a large height, and a transition portion 40 disposed between the center portion 36 and the base portion 38. The bottom wall 34*b* is located further upward of the vehicle in the center portion 36 than in the base portion 38.

In the transition portion 40, the bottom wall 34*b* is inclined to gradually ascend as the bottom wall 34*b* extends from the base portion 38 toward the center portion 36, that is, toward inward along the vehicle width. The configuration including such a transition portion 40 having a gradually varying height can reduce the stress concentration at a connection point between the center portion 36 and the base portion 38 when compared to the configuration without such a transition portion 40. This results in effective reduction in bending or breaking of the cross member 30.

The bottom wall 34b of the cross member 30 is raised upward at the center along the vehicle width to allow the linear members 70 to pass under the cross member 30. As described above, the linear members 70 that are wires and conduits pass through the inside of the tunnel 18. To allow the linear members 70 to pass through, the cross member 30 includes the center portion 36 where the bottom wall 34b is raised upward at the center along the vehicle width.

As illustrated in FIGS. 3 and 4, in the center portion 36 of the cross member 30, the front wall 32f of the cross member upper 32 extends further downward past the bottom wall 34b of the cross member lower 34. In the following description, the portion of the front wall 32f that extends further downward past the bottom wall 34b will be referred to as an "extension portion 33".

A pair of column members 50 are joined to the bottom face of the cross member 30 to extend downward from the bottom face of the cross member 30. The column members 50 are disposed in the center portion 36 of the cross member 30. The column member 50 may have any configuration that is sufficiently rigid. In this example, the column member 50 has a substantially box shape that defines a closed space 51 with the bottom face of the cross member 30.

More specifically, the column member 50 in this example includes a bottom wall 50b facing the bottom wall 34b of the cross member lower 34 vertically, a rear wall 50r extending upward from the rear edge of the bottom wall 50b, and a pair of side walls 50s extending upward from respective opposite ends of the bottom wall 50b in the vehicle width direction. As illustrated in FIGS. 3 and 4, the upper end of the rear wall 50r is joined to the floor panel 10. The upper end of the side wall 50s is joined to the bottom face of the cross member 30. The front end of the side wall 50s and the front end of the bottom wall 50b are joined to the extension portion 33 of the cross member upper 32. In this configuration, a portion of the extension portion 33 facing the rear wall 50r in the vehicle length direction functions as a front wall 50f of the column member 50. The bottom face of the cross member 30, the side walls 50s, the rear wall 50r, the bottom wall 50b, and the front wall 50f that is a portion of the extension portion 33, of the column member 50 form the closed space 51 under the cross member 30. The box shape of the column member 50 and a portion of the cross member upper 32 used as the front wall 50f of the column member 50 enhance rigidity of the column member 50 to effectively prevent distortion of the column member 50.

As illustrated in FIG. 2, a brace 60 connects the pair of column members 50. The brace 60 is a substantially flat-shaped member elongated along the vehicle width. The brace 60 has opposite ends along the vehicle width which are secured to the bottom walls 50b of the respective column members 50. The brace 60 may be welded or fastened with a bolt, for example, to the bottom wall 50b of the column member 50.

With either joining method, the brace 60 is disposed to connect the pair of column members 50 in such a manner as to form a passage channel 42 enclosed by the pair of column members 50, the brace 60, and the bottom wall 34b of the cross member lower 34, under the center portion 36 of the cross member 30. In this example, the passage channel 42 enables the wiring or conduit of the linear members 70 to pass through. In this example, the pair of column members 50 are disposed at positions that overlap the positions of the opposite ends of the tunnel 18 in the vehicle width direction, when viewed in the vehicle length direction. Specifically, the widthwise positions of the inner ends of the respective column members 50 along the vehicle width are substantially set to the widthwise positions of the opposite ends of the tunnel 18 along the vehicle width.

The reasons why the column members 50 and the brace 60 are thus disposed will be described. Typically, the cross member 30 extends between a pair of side members 20 to thereby prevent distortion of the vehicle body. The cross member 30 therefore requires high flexural rigidity. To maintain the high flexural rigidity of the cross member 30, the cross member 30 further requires high second moment of inertia.

Neither the column members 50 nor the brace 60 are joined to a conventional cross member 30. Assuming that such a conventional cross member 30 has a rectangular cross section, the second moment of inertia I of the cross member 30 is expressed as $I = b \times h^3/12$ where b represents the dimension of the cross member 30 along the vehicle length or the width of the cross member 30 and h represents the dimension of the cross member along the vehicle height or the height of the cross member 30. As is clear from this expression, the second moment of inertia I of the cross member 30 is proportional to the width b of the cross member 30 and to third power of the height h of the cross member 30, and thus depends more on the height h than on the width b. It should therefore be understood that increasing the height h of the cross member 30 will effectively increase the flexural rigidity of the cross member 30.

Increasing the height h of the cross member 30, however, would narrow the vehicle cabin or decrease the space where the linear members 70 are allowed to pass. While increasing the board thickness of the cross member 30 would increase the second moment of inertia I without increasing the height h of the cross member 30, this would disadvantageously increase the material costs and vehicle weight.

Figure 5:
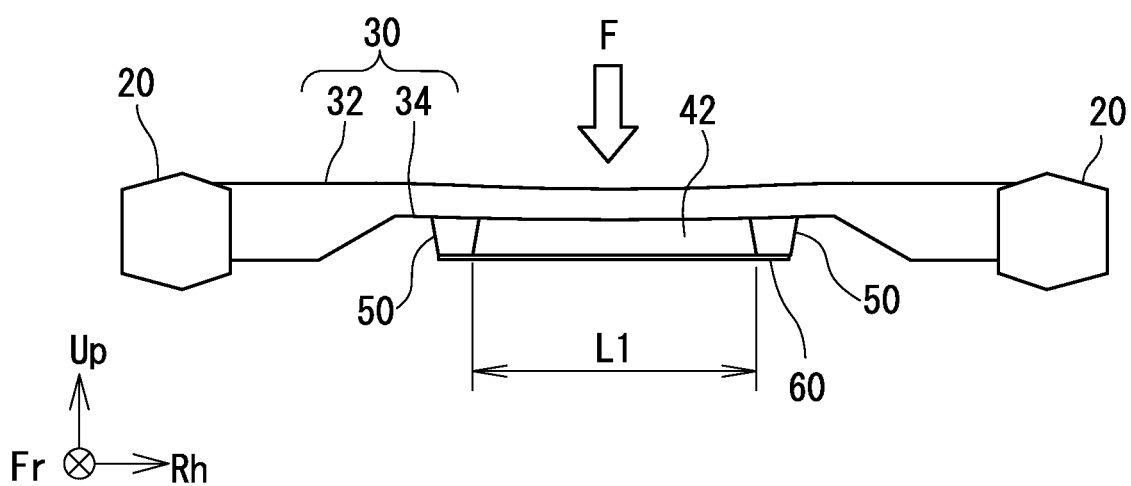
FIG. 5 is a vertical cross sectional view of the cross member with a downward force being applied.
Figure 6:
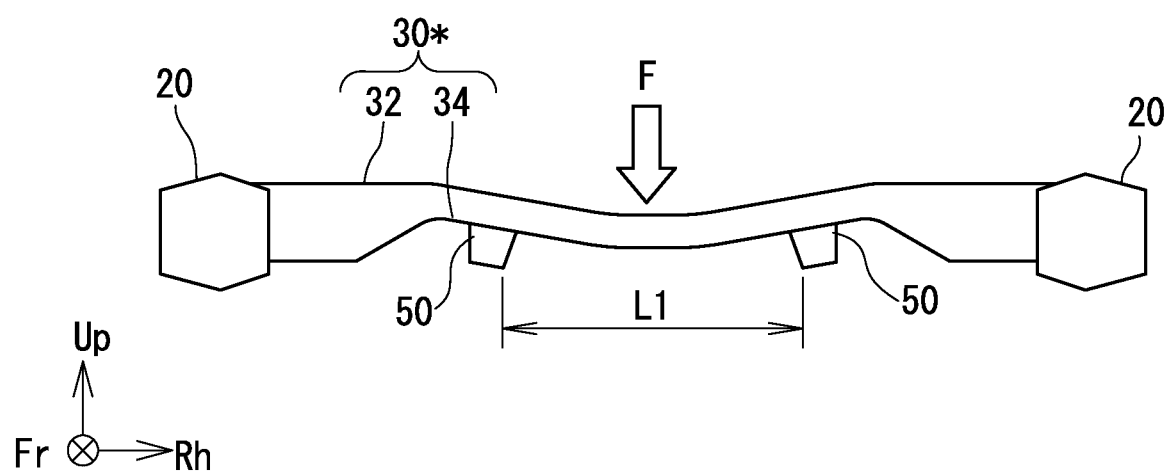
FIG. 6 is a vertical cross sectional view of a cross member in a comparative example, with a downward force being applied.

To resolve these problems, in the present embodiment, the pair of column members 50 protruding downward from the cross member 30, and the brace 60 connecting the pair of column members 50 are disposed. This configuration effectively reduces bending of the cross member 30 without increasing the height and board thickness of the cross member 30. This will be described below by reference to a comparative example. FIG. 5 is a cross sectional view of the cross member 30 with a downward force F being applied to the cross member 30. FIG. 6 is a cross sectional view of the cross member 30* in a comparative example with a downward force F being applied to the cross member 30*.

As illustrated in FIG. 6, the cross member 30* in the comparative example is similar to the cross member 30 in the present embodiment in that the column members 50 are disposed at similar positions, whereas the cross member 30* differs from the cross member 30 in that the brace 60 is not disposed. Application of a downward force F to such a cross member 30* would bend the cross member 30* downward. This bending further causes the bottom face of the cross member 30* to be inclined, changing the orientation of the column members 50 fixed to the bottom face. More specifically, the column member 50 would be inclined to move further outward in the vehicle width direction as the column member 50 approaches downward, which increases the distance L1 between the lower ends of the pair of column members 50 when compared to the distance L1 before the cross member 30* bends. In other words, the pair of column members 50 change their orientations by being inclined outward and upward. The cross member 30* in the comparative example, to which no member is disposed to regulate such a change in the orientation of the column members 50, suffers from bending of the cross member 30* and a change in the orientation of the column members 50 upon receiving the force F.

Meanwhile, regarding the cross member 30 in the present embodiment, the brace 60 connects the pair of column members 50. With this configuration, the brace 60 regulates the change of the distance L1 between the lower ends of the pair of column members 50 when the pair of column members 50 attempt to move diagonally outward and upward. This significantly restricts any change in orientation of the column members 50, which effectively prevents bending of the bottom face of the cross member 30 to which the column members 50 are fixed, and also prevents bending of the entire cross member 30. As a result, the configuration in the present embodiment effectively enhances the flexural rigidity of the cross member 30 while avoiding increasing the height and board thickness of the cross member 30.

In the present embodiment, the pair of column members 50 are disposed sufficiently apart from each other along the vehicle width to secure a space for the passage channel 42 through which the linear members 70 can pass between the pair of column members 50. Effectively using a space at the bottom of the vehicle eliminates the need for a separate space for the linear members 70.

In particular, in the present embodiment, the positions of the inner edges of the column members 50 in the vehicle width direction are substantially aligned with the positions of the lateral opposite ends of the tunnel 18 along the vehicle width. This configuration allows the passage channel 42 and the inner space of the tunnel 18 to be substantially aligned. This further contributes towards securing a substantially straight route for the linear members 70 to pass through both the inner space of the tunnel 18 and the passage channel 42, effectively reducing curving and bending of the linear members 70 and simplifying their disposition.

In the present embodiment, the column members 50 are disposed in the center portion 36 of the cross member 30 having a smaller height. This configuration further enables reduction in the height of the complete beam member including the cross member 30, the column members 50, and the brace 60. In particular, in the present embodiment, the brace 60 is disposed within the range of the vertical dimension, the vertical range, of the cross member 30 or within the range of the vertical dimension, the vertical range, of the side members 20. This configuration allows the height of the bottom structure of the vehicle including the cross member 30 and the side members 20 to be equal to that as in the conventional art, thereby effectively prevent an increase in the size of the bottom structure.

Even with the brace 60, bending and resulting deformation of the column member 50 itself causes bending of the cross member 30. In the present embodiment, however, the column member 50 has a substantially box shape that forms the closed space 51 with the bottom face of the cross member 30, and this configuration increases rigidity of the column member 50 to effectively reduce bending of the column member 50 itself. This further results in more effective reduction in bending of the cross member 30.

In particular, in the present embodiment, part of the extension portion 33 of the cross member upper 32 functions as the front wall 50f of the column member 50. In other words, in the present embodiment, in addition to the upper edge of the column member 50, the front edge of the column member 50 is fixed to the panel member forming the cross member 30. This configuration further effectively reduces deformation and inclination of the column member 50, thereby further effectively reducing bending of the cross member 30.

Figure 7:
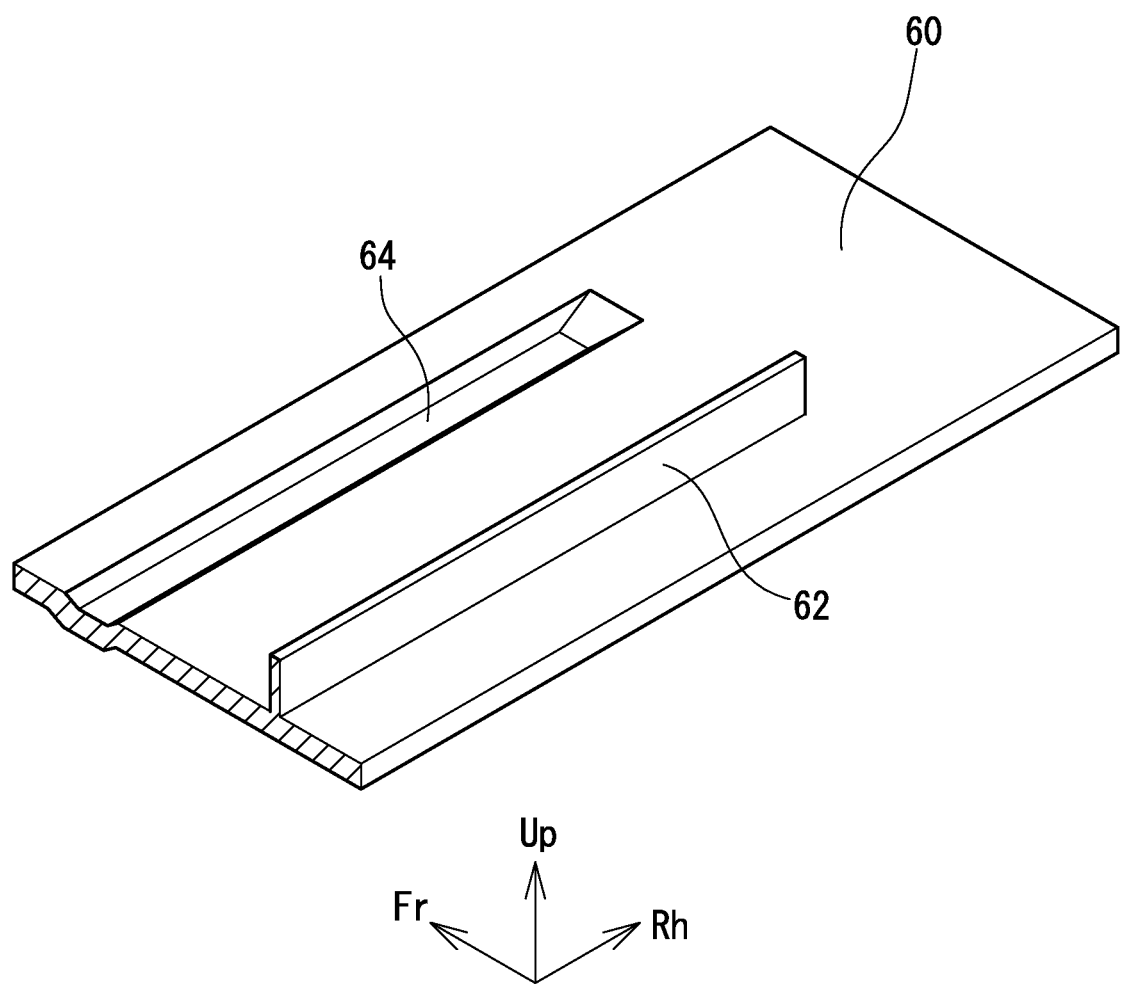
FIG. 7 is a perspective view illustrating a further example brace.

The configuration described above is only an example, and any configurations including at least a plurality of column members 50 protruding downward from the bottom face of the cross member 30 and the brace 60 extending to connect between the column members 50 may be employed. For example, while in the above example, the brace 60 has a substantially flat plate shape, the shape of the brace 60 may be modified as appropriate. Therefore, the brace 60 may be an angle bar having a cross section of a substantially L shape, T-shape, or U-shape, for example, or may have a substantially box shape having six faces orthogonal to one another. Further, it is significant that the brace 60 is free from bending in the vehicle width direction. To prevent bending of the brace 60, the brace 60 may include a rib 62 or a bead 64 elongated along the vehicle width as illustrated in FIG. 7.

The shape of the column member 50 may also be modified as appropriate and may be a plate shape or a rod shape, rather than a box shape. Further, the column members 50 may be fixed to any locations on the bottom face of the cross member 30. The column members 50 may therefore be disposed at locations that do not overlap the respective widthwise ends of the tunnel 18 when viewed from the vehicle length direction. The column member 50 may be disposed in a portion other than the center portion 36 and may be disposed in the transition portion 40, for example. The vertical dimensions of the column member 50 and the brace 60 are not restricted, and the brace 60 may be located further downward than the lowermost end of the cross member 30 or the lowermost end of the side member 20.

Figure 8:
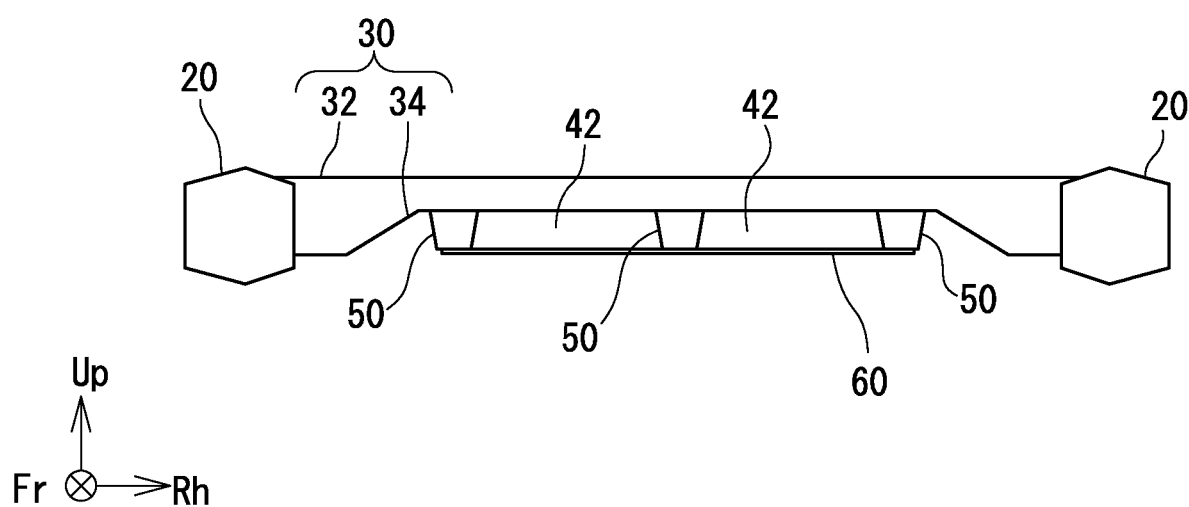
FIG. 8 is a vertical cross sectional view of a vehicle bottom structure according to a further embodiment.
Figure 9:
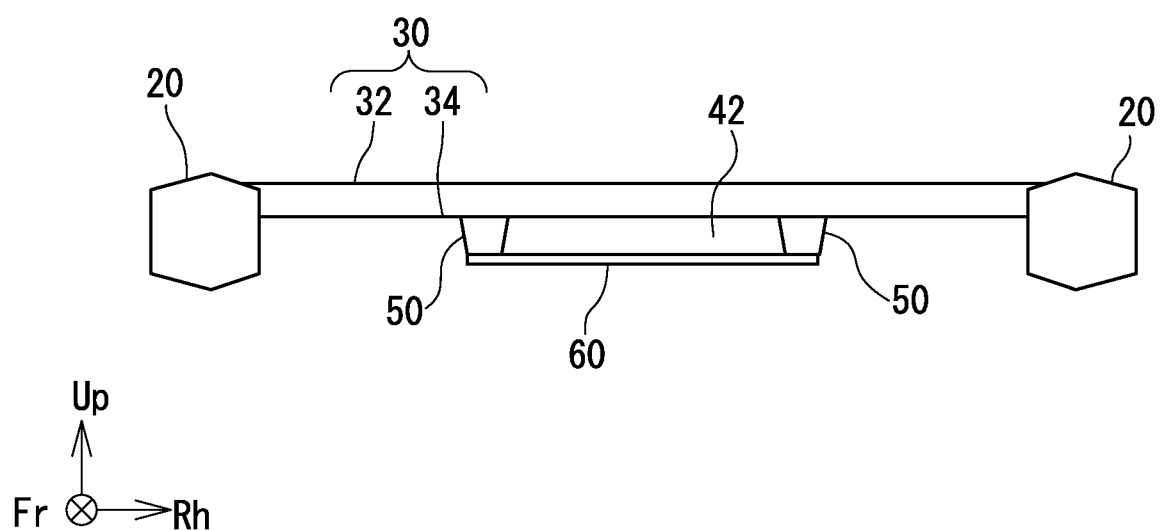
FIG. 9 is a vertical cross sectional view of a vehicle bottom structure according to a still further embodiment.

Any number of two or more column members 50 may be provided. For example, three column members 50 may be disposed at intervals along the vehicle width, as illustrated in FIG. 8. This configuration reduces the distance between two adjacent column members 50, thereby more effectively preventing bending of the cross member 30. Further, while in the present embodiment, the height of the cross member 30 varies along the vehicle width, the cross member 30 may have a fixed height as illustrated in FIG. 9.

REFERENCE SIGNS LIST 10 floor panel, 18 tunnel, 20 side member, 22 side member inner, 24 side member outer, 30, 30* cross member, 32 cross member upper, 33 extension portion, 34 cross member lower, 36 center portion, 38 base portion, 40 transition portion, 42 passage channel, 50 column member, 50b bottom wall, 50r rear wall, 50s side wall, 50f front wall, 51 closed space, 60 brace, 62 rib, 64 bead, 70 linear member.

The invention claimed is:

1. A vehicle bottom structure comprising:
a cross member disposed on a bottom of a vehicle and elongated along a vehicle width;
a plurality of column members disposed at intervals along the vehicle width, each of the plurality of column members protruding downward from a bottom face of the cross member, each of the plurality of column members has a substantially box shape that, in conjunction with the bottom face of the cross member, defines a closed space therein; and
a brace extending to connect the plurality of column members.

2. The vehicle bottom structure according to claim 1, wherein
a linear member that is wiring or conduit passes through a passage channel that is a space enclosed by the cross member, a pair of adjacent column members of the plurality of column members, and the brace.

3. The vehicle bottom structure according to claim 2, further comprising:
a tunnel rising upward of the vehicle from a floor panel and elongated along a vehicle length, wherein
the plurality of column members comprise a pair of column members adjacent along the vehicle width,
the pair of column members are respectively disposed at positions in a vehicle width direction substantially corresponding to widthwise positions of respective opposite ends of the tunnel along the vehicle width.

4. The vehicle bottom structure according to claim 1, wherein
the cross member comprises a center portion and a pair of base portions located on opposite sides of the center portion along the vehicle width,
the center portion includes a bottom face located further upward than bottom faces of the respective base portions to thereby have a vertical dimension that is smaller than vertical dimensions of the base portions, and
the plurality of column members protrude downward from the bottom face of the center portion.

5. The vehicle bottom structure according to claim 4, wherein
the cross member further comprises transition portions between the center portion and the respective base portions, and
each of the transition portions includes a bottom face that is gradually inclined upward as the bottom face extends from the base portion toward the center portion.

6. The vehicle bottom structure according to claim 4, wherein
the cross member comprises a cross member upper and a cross member lower that face each other vertically,
the cross member upper includes, in the center portion of the cross member, an extension portion extending further downward past a front lower end of the cross member lower, and
each of the plurality of column members comprises:
a bottom wall facing the cross member vertically,
a rear wall extending upward from a rear end of the bottom wall; and
a pair of side walls extending upward from respective opposite ends of the bottom wall along the vehicle width and joined to the bottom face of the cross member,
the bottom wall and the pair of side walls of the column member having front ends joined to the extension portion, and
the extension portion includes a portion that faces the rear wall of the column member, the portion functioning as a front wall of the column member.

7. The vehicle bottom structure according to claim 1, wherein
the brace is disposed within a vertical dimension of the cross member.

8. The vehicle bottom structure according to claim 1, further comprising:
a pair of side members that are frame members coupled with respective opposite ends of the cross member along the vehicle width and elongated along the vehicle length,
wherein the brace is disposed within a range of a vertical dimension of the pair of side members.

9. The vehicle bottom structure according to claim 1, wherein
the brace is disposed below the cross member not in direct contact with the cross member, and is fixed to a bottom face of each of the column members; and
a passage channel enclosed by a bottom wall of the cross member, side walls of a pair of adjacent column members of the plurality of column members, and an upper face of the brace, extends along a vehicle length.

10. The vehicle bottom structure according to claim 1, wherein
each of the plurality of column members comprises:
a bottom wall facing a bottom wall of the cross member vertically;
a pair of side walls extending upward from respective opposite ends of the bottom wall in a vehicle width direction;
a rear wall extending upward from a rear end of the bottom wall; and
a front wall extending upward from a front end of the bottom wall.

* * * * *